United States Patent
Park

[11] Patent Number: 5,936,200
[45] Date of Patent: Aug. 10, 1999

[54] EASY JUNCTION BOX

[76] Inventor: Mike K. Park, 14607 Almanac Dr., Burtonsville, Md. 20866

[21] Appl. No.: 08/924,319

[22] Filed: Sep. 5, 1997

Related U.S. Application Data

[60] Provisional application No. 60/041,784, Apr. 1, 1997.

[51] Int. Cl.⁶ ....................................................... H02G 3/18
[52] U.S. Cl. ........................ 174/59; 174/65 R; 174/84 C; 439/721
[58] Field of Search ................................. 174/59, 60, 50, 174/61, 65 R, 84 C; 439/721, 722, 723, 724, 856, 535

[56] References Cited

U.S. PATENT DOCUMENTS

| | | | |
|---|---|---|---|
| 2,451,393 | 10/1948 | Kershaw | 174/59 X |
| 2,463,033 | 3/1949 | A. De V. Harnett . | |
| 2,463,034 | 3/1949 | A. De V. Harnett . | |
| 2,574,608 | 11/1951 | Ziph . | |
| 2,824,166 | 2/1958 | Madaras et al. . | |
| 2,831,914 | 4/1958 | Jacobs . | |
| 2,917,724 | 12/1959 | Jackson | 439/721 |
| 3,265,807 | 8/1966 | Smith | 174/84 C X |
| 3,566,006 | 2/1971 | Metcalf | 174/84 C |
| 3,835,241 | 9/1974 | Masterson et al. | 174/84 C X |
| 3,848,224 | 11/1974 | Olivero | 174/59 X |
| 4,019,250 | 4/1977 | Bassett et al. | 174/84 C X |
| 4,151,364 | 4/1979 | Ellis | 174/84 C |
| 4,210,772 | 7/1980 | Magana et al. | 174/59 |
| 4,636,017 | 1/1987 | Boteler | 174/117 FF X |
| 4,875,957 | 10/1989 | Etheridge | 156/85 |
| 5,212,346 | 5/1993 | Clark | 174/59 |
| 5,243,130 | 9/1993 | Kitigawa | 174/50 |
| 5,471,012 | 11/1995 | Opel | 174/53 |

*Primary Examiner*—Dean A. Reichard
*Attorney, Agent, or Firm*—James Creighton Wray; Meera P. Narasimhan

[57] ABSTRACT

A junction box has a base, a top, and side walls extending between the base and the top. A mount is connected to the junction box for mounting a junction box on a structure. Plural conductor plates within the junction box are separated by plural insulator layers. The plates are aligned generally parallel to the base and the top. The conductor plates are spaced inward from the walls. Metal conductors extend from the conductor plates partially toward the walls. Connectors having metal conductive cylinders and having outer insulator cylinders extend axially beyond the metal conductors. The metal conductive cylinders have inner and outer ends. The inner ends are permanently attached to the conductors extending from the plates. The insulator cylinders have inner and outer ends. The inner ends of the insulator cylinders extend over the conductors. The outer ends of the insulator cylinders extend to the side walls of the junction box. Multiple holes are arranged in sets of three in the side walls of the junction box. The outer ends of the conductive cylinders extend to the holes in the walls. Each of the holes has a connector from one of the plates.

23 Claims, 4 Drawing Sheets

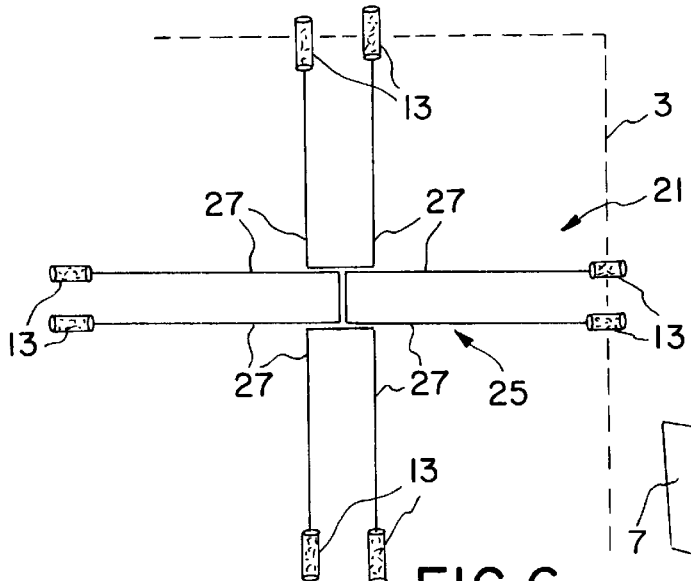
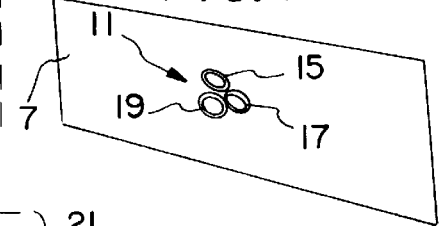
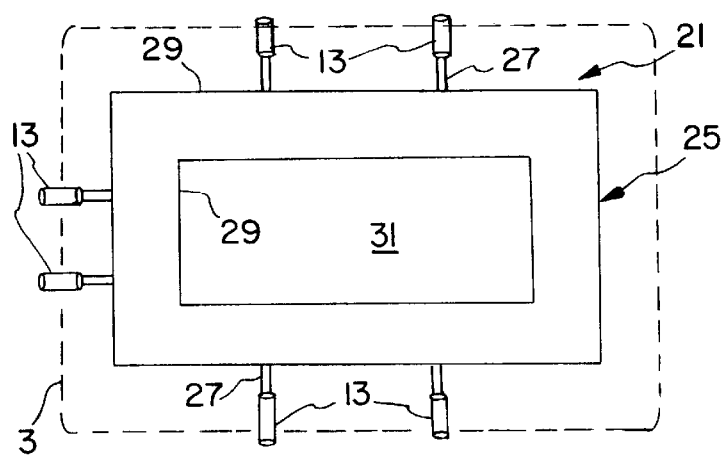
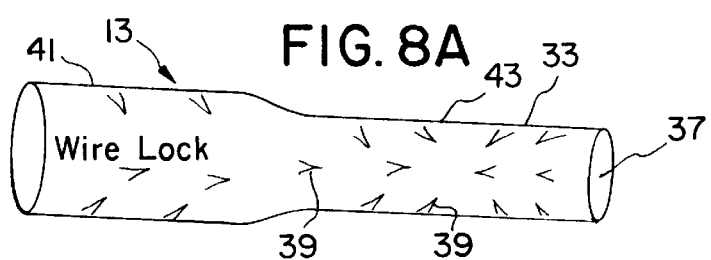

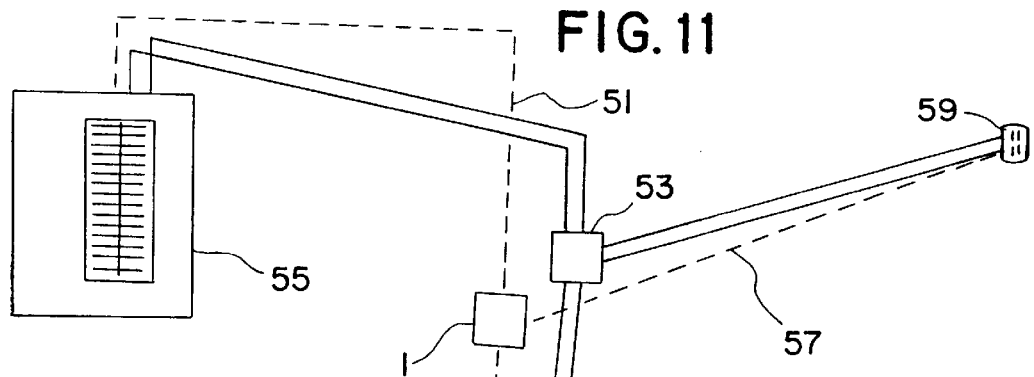
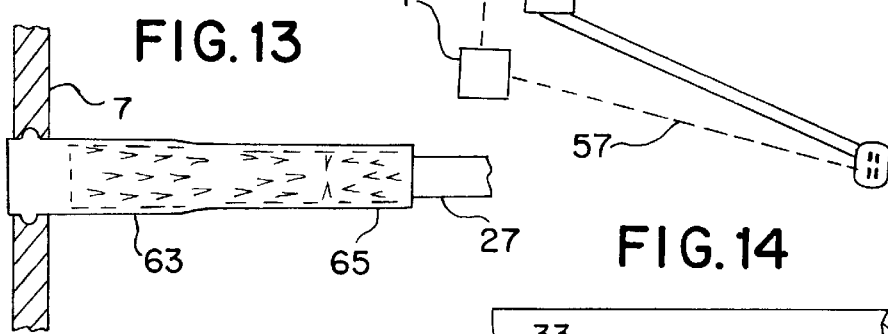
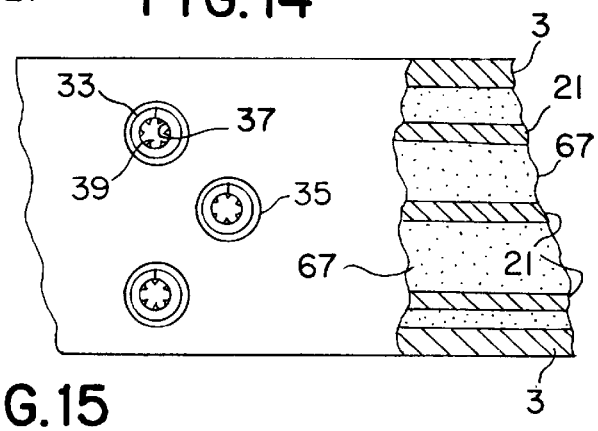
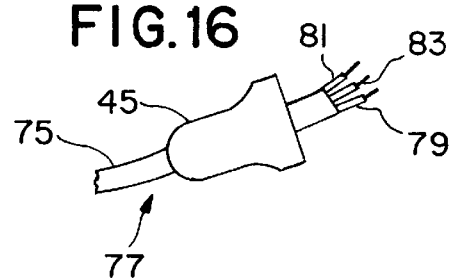
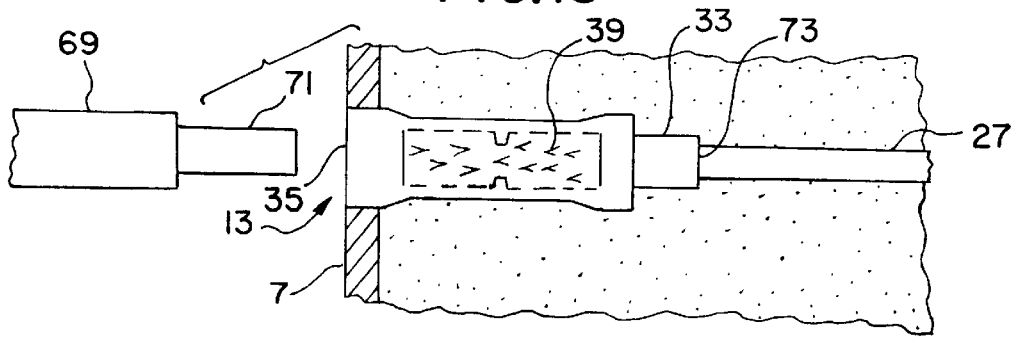

EASY JUNCTION BOX

This application claims the benefit of U.S. Provisional Application No. 60/041,784, filed Apr. 1, 1997.

BACKGROUND OF THE INVENTION

The present invention relates to electrical junction boxes.

Existing junction boxes generally include rectangular or square metal or plastic box-like structures having a removable panel. An open cavity for receiving ends of multi-wire cables is defined by the walls of the structure. Holes are provided in side walls of the structure for receiving the ends of the multi-wire cables. Clamps are provided for fixing the cables with respect to the box and for holding ends of the cables in the open cavity of the box-like structure. Insulation surrounding ends of the cables is stripped, thereby exposing the individual wires, which are usually two or three in number, of each cable. Wire connections are formed by joining like wires using wire nuts.

Existing junction boxes have proven bothersome and difficult to use. Junction boxes are often positioned in awkward, difficult to reach places in houses and buildings where poor lighting conditions generally exist. To check electrical connections or join additional cables, electricians must remove the screws securing the cover to the box-like structure, tighten or loosen the clamps securing the cables to the box, and bend, pull and twist the wire nuts and wire ends. Wire nuts are unwieldy and must be manipulated along with the wires in the crowded open space of the junction box prior to reattaching the cover. That manipulation results in loose wire connections and short circuits. Needs exist for junction boxes that provide for multiple cable attachment without the need for tools, wire nuts or clamps and without removing junction box panels.

Potentially fatal situations arise when electricians or homeowners mistakenly cross-connect wires. Needs exist for electrical junction boxes that minimize the likelihood of such mishaps.

SUMMARY OF THE INVENTION

The present invention is an electrical junction box that receives and holds ends of multi-conductor cables without the need for clamps, connectors, wire nuts or electrical tape. The box includes a casing having connector plates provided therein. Preferably, three plates are positioned in the casing—one for the hot line, one for the neutral line and one for the ground. The plates are stacked on top of each other, with layers of electrical insulating material positioned between the plates. Multiple terminals extend from sides of each plate. All terminals of a single plate are electrically connected. The terminals are preferably color coded and may have raised letters such that an electrician easily identifies the polarity of each terminal. Openings are provided in sides of the casing for receiving sides of the terminals. In preferred embodiments, the connector plates and the terminals have dimensions and are configured such that they may be easily installed in existing plastic and metal junction boxes. In one preferred embodiment, the junction box includes a casing having a bottom, a cover, four sides, three plates, two or four insulators, and four sets of terminals, with one set of terminals extending through openings in each side of the casing. In another preferred embodiment, each plate carries eight terminals, such that two sets of terminals extend from each side of the casing.

Each terminal of the junction box preferably includes an inner clamping part made of a conductive material such as an alloy of copper or nickel, and an outer, PVC insulator cover. Each terminal has a generally circular cross-section and includes a wide section extending outward from the casing and a narrow section housed within the casing. The inner surface of the inner part includes small inward extensions for gripping and holding the wire in the terminal. In preferred embodiments, the insulator covers of the terminals are color coded, with terminals for receiving hot lines being black, terminals for receiving neutral lines being white, and terminals for receiving ground wires being green. The terminals are positioned on the plates such that when the plates are stacked, the terminals are offset and arranged in sets, with each set including one terminal from each plate.

Rigid or flexible elastomeric cable connectors are included for sealing and preventing access to or contact with the wires and for preventing the wires from accidentally releasing from the terminals. Each connector is hollow and has a generally circular cross-section, with its inner cavity gradually decreasing in diameter outwardly from the casing-abutting end. A cable carrying multiple wires proceeds through the cavity. The wires of the cable are individually inserted in appropriate terminals and the connector is urged toward the side of the casing. The connector tightens around the wire and engages the casing for preventing unintended release.

The new junction box may be used to run additional ground wires in older houses and buildings. Instead of searching for existing junction boxes, the present boxes, including the housed wire connection plates, are installed in convenient locations. Ground wires are run from the breaker switch box to the present junction boxes and then to appropriate outlets.

Wire nuts, clamps, electrical tape and screwdrivers are not needed when connecting wires using the present junction box. Cable wires are slid into appropriate terminals extending from sides of the box and are secured in the terminals by teeth jutting from the inner linings of the terminals.

A junction box has a base, a top, and side walls extending between the base and the top. A mount is connected to the junction box for mounting a junction box on a structure. Plural conductor plates within the junction box are separated by plural insulator layers. The plates are aligned generally parallel to the base and the top. The conductor plates are spaced inward from the walls. Metal conductors extend from the conductor plates partially toward the walls. Connectors having metal conductive cylinders and having outer insulator cylinders extend axially beyond the metal conductors. The metal conductive cylinders have inner and outer ends. The inner ends are permanently attached to the conductors extending from the plates. The insulator cylinders have inner and outer ends. The inner ends of the insulator cylinders extend over the conductors. The outer ends of the insulator cylinders extend to the side walls of the junction box. Multiple holes are arranged in sets of three in the side walls of the junction box. The outer ends of the conductive cylinders extend to the holes in the walls. Each set of holes has a connector from one plate.

Preferably, the insulator cylinders are insulator tubes and the outer ends of the outer insulator tubes extend through the walls.

In preferred embodiments, the outer ends of the outer insulator tubes extend to positions flush with outer surfaces of the walls.

Preferred insulator tubes have radially enlarged outer ends with inner diameters sufficient for receiving wire insulation and the inner cylindrical conductive cylindrical connectors have diameters sufficient for receiving copper wires.

Preferably, the inner conductive cylindrical connectors have lanced triangular shark teeth bent inward in the cylinder for engaging the conductor on the plate and the wire which is pushed into the conductor. The points on the shark teeth penetrate the wire and the conductor and bite into them to prevent outward pulling of a wire once installed. In one embodiment, the shark teeth grippers are permanently or integrally formed on the plates and the shark teeth point inward to grip an inserted wire. Preferably the junction box cannot be opened and the wire cannot be removed.

The sides of the junction box have multiple sets of holes for pushing stripped ends of Romex copper wires into the holes.

Preferably the holes are color-coded, with the central hole in each set being colored green for ground and outer holes in each set being colored black for common or white for neutral. The black and white match the black and white insulated sleeves on the Romex wires. The green receives the bare ground wire.

The plates are preferably flat angular metal plates. The conductors extend outward from the flat plates. The conductors may be welded, brazed or soldered on the plates, or they may be integrally formed with the plates.

In one embodiment, each plate has flat interconnected wire arrangements with wires extending across the box in diverse directions. In that case, the conductors are the ends of the wires.

In one embodiment, the conductors and the cylindrical connectors are formed integrally with the plate. The connectors are formed flat, are lanced to form the shark teeth and are rolled into cylinders.

A preferred junction box has a base, sides connected to the base, plural flat conductor layers mounted in the base and plural insulator layers mounted between the conductor layers. The insulator layers extend to the side walls, and the conductor layers are spaced from the side walls. The conductor layers have conductor tips extending from the conductor layers toward the side walls and terminating short of the side walls. Holes in the side walls are arranged in sets of three and are aligned with the conductor tips. Connectors have inner ends connected to the conductor tips and have outer ends extending to the openings in the side wall for receiving stripped ends of solid copper wire in the outer ends of the connectors.

These and further and other objects and features of the invention are apparent in the disclosure, which includes the above and ongoing written specification, with the claims and the drawings.

BRIEF DESCRIPTION OF THE DRAWINGS

FIG. 5 is a schematic illustration of a preferred interior component of the present invention.

FIG. 6 is a schematic illustration of a preferred interior component of the present invention having six terminals.

FIG. 7 is a detail of a side wall of the box of FIG. 4.

FIG. 8A is a schematic illustration of the inner part of a terminal for in the present invention.

FIG. 8B is a schematic illustration of the outer part of a terminal for use in the present invention.

FIG. 11 a schematic illustration of an electrical system showing use of the present boxes in running an additional ground wire.

FIG. 13 is a schematic illustration showing a cylindrical connector with stepped outer diameters.

FIG. 14 is a detail of a side wall of the junction box with color coded openings.

FIG. 15 is a schematic illustration of a stripped wire tip engaging with a connector in the junction box.

FIG. 16 is a schematic illustration of a Romex cable with an elastomeric sleeve.

DETAILED DESCRIPTION OF THE PREFERRED EMBODIMENTS

Figure 1:
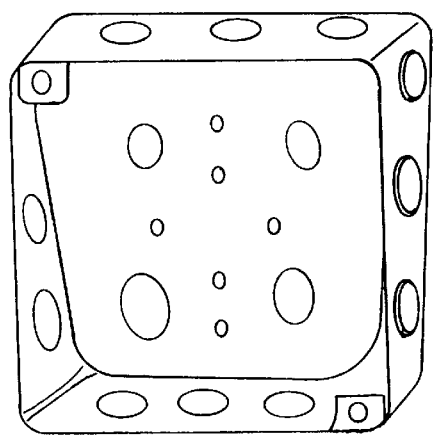
FIGS. 1,2 and 3 schematically show prior art electrical junction boxes.
Figure 2:
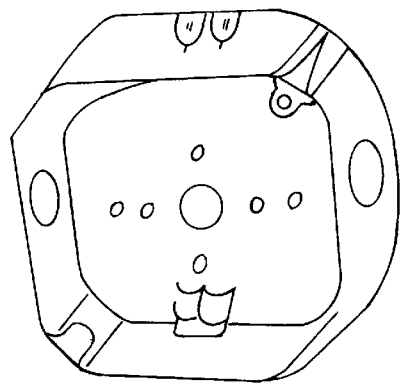
Figure 3:
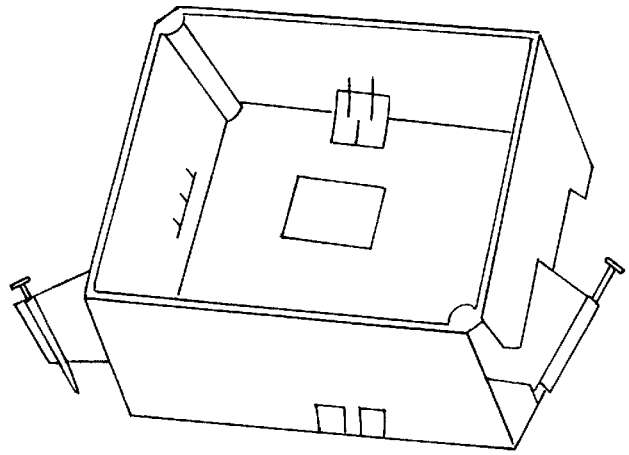

FIGS. 1–3 show three examples of electrical junction boxes currently on the market. The present invention may include any of those existing junction boxes as the casing or shell.

Figure 4:
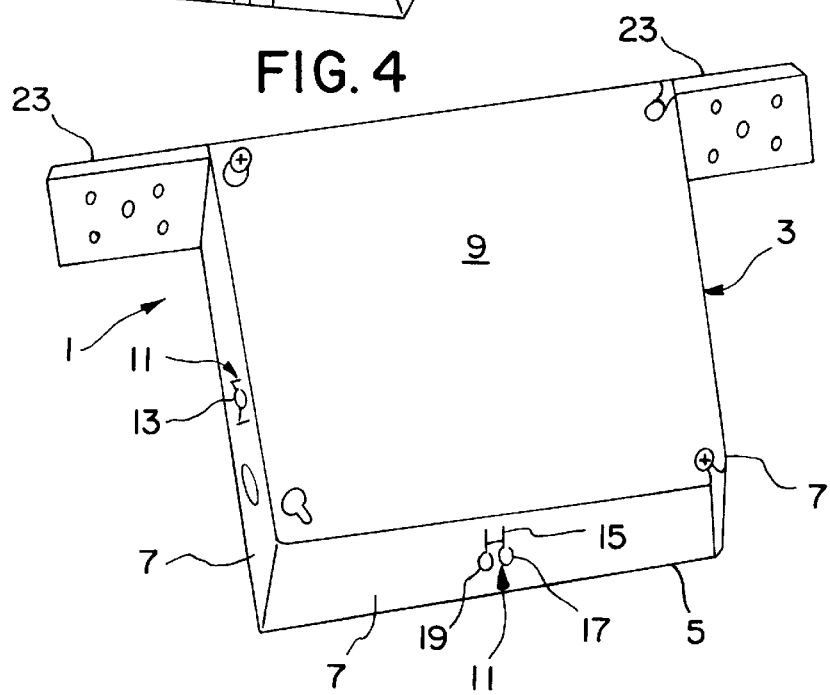
FIG. 4 is a schematic illustration of the exterior of the present invention.
Figure 9A:
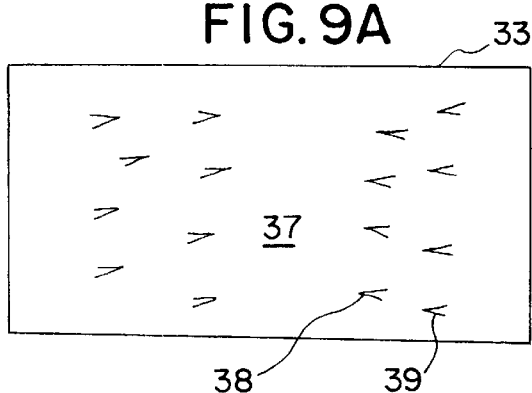
FIGS. 9A–D show a preferred inner part for a terminal in various stages of assembly.
Figure 9B:
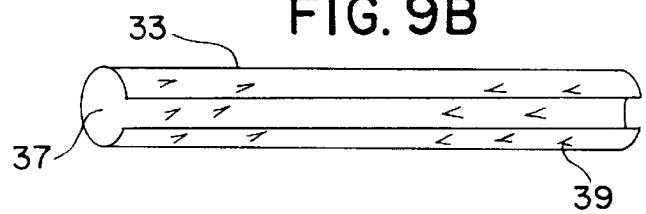
Figure 9C:
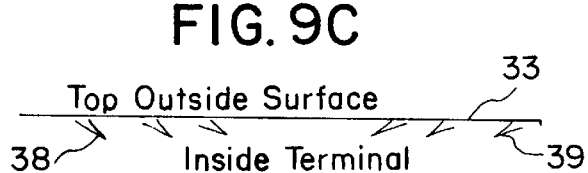

As shown in FIG. 4, the present junction box 1 includes a casing 3 having connector plates provided therein. The casing 3 may be made of plastic, metal or any other acceptable material and may take any shape or size. In preferred embodiments, the casing 3 has a generally rectangular or square cross-section and includes a base 5, side walls 7 extending from edges of the base 5 and a cover 9. The cover 9 may be removably secured to upper edges of the walls 7 by screws or other connectors or may be permanently connected to the walls 7. Permanent connection of the cover 9 is possible since electricians have no need to enter the plate-receiving cavity defined by the walls 7, base 5 and cover 9. Sets 11 of terminals 13 for receiving wires extend through openings provided in the walls 7 of the casing 3. As shown in FIGS. 4 and 7, each set 11 preferably includes three terminals: one 15 for receiving a hot wire, one 17 for receiving a neutral wire, and one 19 for receiving a ground wire. The number of terminals 13 in a set 11 may be lesser or greater than three.

In preferred embodiments, the terminals 13 of each set 11 are coded, preferably by color, to ensure proper wire connection. Any number of sets 11 of terminals 13 may be provided. FIG. 4 shows an embodiment wherein a single set 11 of terminals 13 extends through each side wall 7. FIG. 5 shows an embodiment of a connector plate 21 having eight terminals 13. In embodiments of the present invention 1 including those connector plates 21, two sets 11 of terminals 13 extend through each wall 7.

FIGS. 5 and 6 show preferred embodiments of the prefabricated wire connector plates 21 for use in the present invention. Each connector plate 21 includes an array 25 of electrical conductors 27 having terminals 13 provided at free ends. The conductors 27 are interconnected such that wires inserted in one terminal 13 are electrically connected to wires positioned in any other terminal 13 of the same plate 21. As shown in FIG. 6, each connector plate 21 includes an electric power distribution plate 29. Terminals 13 extend from or are connected to side edges of the plate 29. Any number of terminals 13 may be provided. The center 31 of the plate 29 may be open and preferably has a shape that is similar or identical to the a cross-section of the casing 3. The plates 29 may be soldered, bent wires with terminals 13 at each of four ends as shown in FIG. 5.

In preferred embodiments, three of the wire connector plates 21 of FIGS. 5 or 6 are provided in the casing 3 of the present junction box 1. The connector plates 21 are stacked on top of one another with insulating material provided between the connector plates 21 for electrically insulating the connector plates 21. When the boxes are conductive, two additional insulator layers are added on the outer plate. The connector plates 21 are stacked such that the terminals 13 extending from edges of the connector plates 21 are arranged in sets 11. As shown in FIG. 7, the terminals 13 are preferably arranged in sets of three and in a triangular configuration.

Individual wires from a multi-wire cable are fed into a set 11 of terminals 13. The terminals 13 are color coded such that there is no question as to the polarity of the terminals 13. One set 11 of terminals 13 receives the supply wires extending from the breaker box. The remaining sets 11 of terminals 13 receive groups of wires from branch circuits.

FIGS. 8A, 8B and 9A–D show preferred embodiments of the terminals 13. Each terminal 13 includes an inner, clamping part 33 and an outer insulator cover 35. The cover 35 is preferably color coded or otherwise marked for identifying the polarity of the connector plate 21. The inner part 33 includes an inner surface 37 having teeth 39 or other small extensions for gripping and holding a wire.

Each terminal 13 of the junction box 1 preferably includes an inner clamping part 33 made of copper or nickel, and an outer, PVC insulator cover 35. Each terminal 13 has a generally circular cross-section and includes a wide section 41 extending outward to the casing 3 and a narrow section 43 housed within the casing 3. The inner surface 37 of the inner part 33 includes small shark tooth-like extensions 39 with inward extending points 38 for gripping and holding the wire in the terminal 13. The terminals 13 are positioned on the plates 21 such that when the plates 21 are stacked, the terminals 13 are arranged in sets 11, with each set 11 including one terminal 13 from each plate 21.

Figure 10:
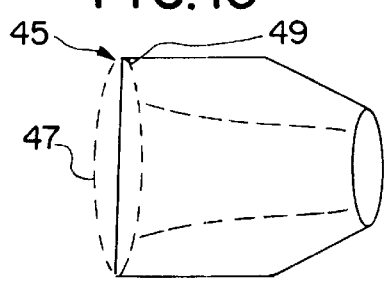
FIG. 10 is a schematic illustration of a sleeve for covering a cable at the casing.
Figure 9D:
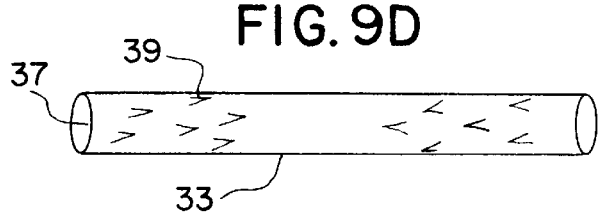

FIG. 10 shows a preferred elastomeric sleeve 45 for covering ends of cables at casing 3. The sleeve 45 is hollow and has a generally circular cross-section, with its inner cavity 47 gradually decreasing in diameter outwardly from the casing abutting end 49. A cable carrying multiple wires proceeds release through the cavity 47. The wires of the cable are individually inserted in appropriate terminals 13, and the sleeve 45 is urged toward the side wall 7 of the casing 3. The sleeve 45 tightens around the wire for preventing unintended release.

FIG. 11 shows how the present box 1 may be used to install ground wires in older homes. Instead of searching for existing junction boxes 53, an electrician installs the present box 1 in a convenient, easily-accessed location. A ground wire 51 is run from the circuit breaker box 55 to the present junction box 1. Branch ground wires 57 may then be run directly from the present junction box 1 to electrical outlets 59.

Figure 12:
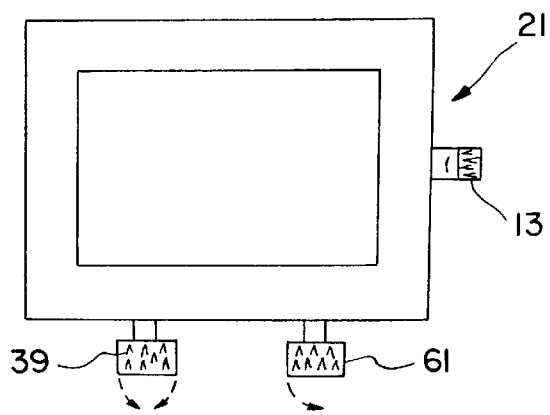
FIG. 12 is a schematic illustration showing cylindrical connectors formed integrally with the plate.

FIG. 12 shows cylindrical connectors 13 formed integrally with the plate 21. The connectors 13 are formed flat 61, lanced to form the shark teeth 39 and are rolled into cylinders 13. The shark teeth 39 point inward to grip an inserted wire.

FIG. 13 shows a cylindrical connector with stepped outer diameters 63, 65. The diameter of the cylindrical connector decreases outwardly from the side wall 7 of the junction box for receiving and holding wires of varied sizes.

Color-coded openings in a side wall of the junction box are shown in FIG. 14. The inner part 33 of the opening has an inner surface 37 having teeth 39 or other small extensions for gripping and holding a wire. The outer part 35 is color-coded or otherwise marked for receiving the ground, common and neutral wires. The outer part 35 receives the insulation covering the wire. Connector plates 21 are stacked on top of one another inside the casing 3 of the junction box with insulating material 67 provided between the connector plates for electrically insulating the connector plates.

FIG. 15 shows the outer insulating part 35 of a terminal flush with the side wall 7 of the junction box. The outer part 35 receives the wire insulation 69. Stripped wire tips 71 are held in the inner part 33 of the connectors 13 by shark teeth 39. Electrical conductors 27 interconnected within the junction box are held in the inner end 73 of the inner part 33 by sharks teeth 39.

An elastomeric sleeve 45 gripping the outer insulation 75 of a Romex cable 77 is shown in FIG. 16. The Romex cable 77 houses an outer black colored common wire 79, an outer white colored neutral wire 81 and an inner green colored ground wire 83. The sleeve 45 butts against the junction box casing to prevent unintended release of the wires 79, 81, 83.

While the invention has been described with reference to specific embodiments, modifications and variations of the invention may be constructed without departing from the scope of the invention, which is defined in the following claims.

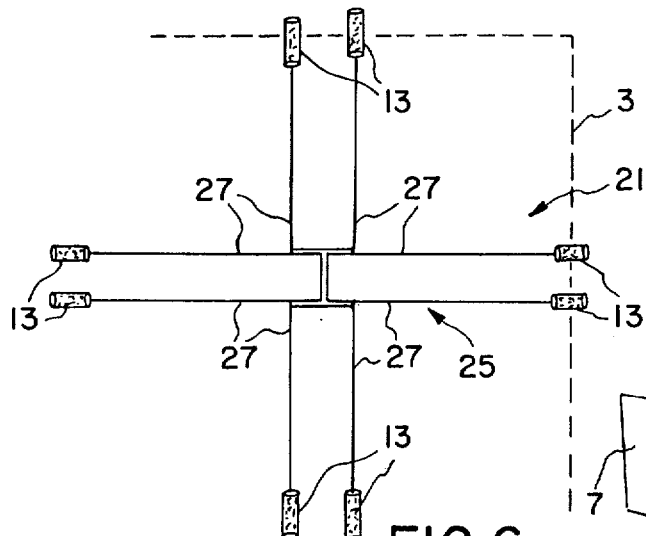
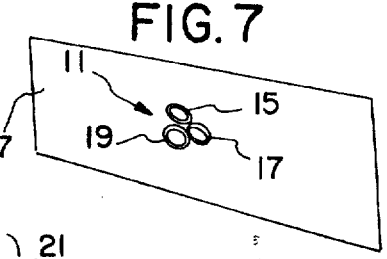
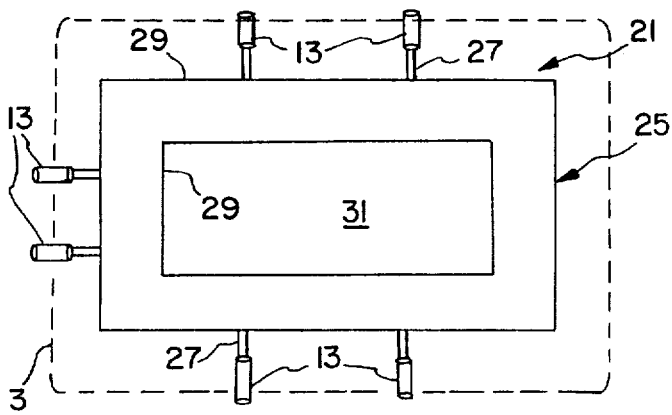
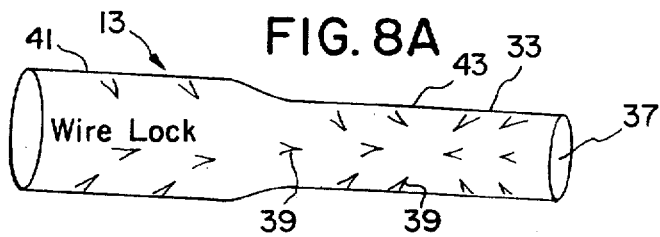

I claim:

1. A junction box having a base, a top, side walls extending between the base and the top and a mount connected to the junction box for mounting the junction box on a structure, plural conductor plates within the junction box, plural insulator layers separating the conductor plates, the plates being aligned generally parallel to the base and the top, the conductor plates being spaced inward from the side walls, metal conductors extending from the conductor plates partially toward the side walls, connectors having metal conductive cylinders and having outer insulator cylinders extending axially beyond the metal conductors, the metal conductive cylinders having inner and outer ends, the inner ends being permanently attached to the conductors extending from the plates, the insulator cylinders having inner and outer ends, the inner ends of the insulator cylinders extending over the conductors, the outer ends of the insulator cylinders extending to the side walls of the junction box, multiple holes arranged in sets of three in the side walls of the junction box, the outer ends of the conductive cylinders extending to the holes in the side walls, each of the holes having a connector from one of the plates.

2. The apparatus of claim 1 wherein the outer ends of the outer insulator cylinders extend through the side walls.

3. The apparatus of claim 2 wherein the outer ends of the outer insulator cylinders extend to positions flush with outer surfaces of the side walls.

4. The apparatus of claim 1 wherein the insulator cylinders have radially enlarged inner and outer ends with inner diameter sufficient for receiving wire insulator and wherein the inner ends of the insulation cylinders have diameters sufficient for receiving copper wires.

5. The apparatus of claim 1 wherein the metal conductive cylinders have lanced triangular sharp teeth bent inward therein for engaging the conductor on the plate and the wire which is pushed into the conductor.

6. The apparatus of claim 1 wherein the side walls of the junction box have multiple sets of holes for pushing stripped ends of copper wires into the holes.

7. The apparatus of claim 6 wherein each hole is color coded with the central hole in each set being coded green for ground and outer holes in each set being coded black for common or white for neutral.

8. The apparatus of claim 1 wherein the plates comprise flat angular metal plates with the conductors extending outward from the plates.

9. The apparatus of claim 1 wherein each plate comprises flat interconnected wire arrangements with wires extending across the box in diverse directions and wherein the metal conductors comprise ends of the wires.

10. The apparatus of claim 1 wherein the metal conductors and connectors are formed integrally with the plate.

11. The apparatus of claim 1 wherein the top is permanently sealed to the side walls.

12. The apparatus of claim 11 wherein each of the connectors have an inner end for connecting to the metal conductors and wherein outer ends of the connectors have stepped diameters with inward pointing sharp teeth grippers for receiving and holding wires of varied sizes.

13. The apparatus of claim 12 wherein the wires are assembled in a cable with an outer black colored common wire and an outer white coated neutral wire and an inner green colored ground wire and wherein the holes in the walls are colored coded for receiving the ground, common and neutral wires.

14. The apparatus of claim 13 further comprising an elastomeric sleeve having a central opening extending there through and gripping an outer insulation of the cable, the sleeve being slid back along the cable away from the junction box when connecting stripped wire ends to the connectors in the junction box.

15. A junction box having a base, a side wall connected to the base, plural flat conductor layers mounted in the base, plural insulator layers mounted between the conductor layers, the insulator layers extending to the side wall and the conductor layers being layered spaced from the side wall, each of the conductor layers having conductor tips extending from the conductor layer toward the side wall and terminating short of the side wall, holes in the side wall arranged in sets of three and aligned with the conductor tips, connectors having inner ends connected to the conductor tips and having outer ends extending to the holes in the side wall for receiving stripped ends of solid copper wire in the outer ends of the connectors.

16. The apparatus of claim 15 wherein the connectors comprise rolled metal cylinders with triangular inward facing shark teeth having lanced sides and ends connected to the cylinder and having points pressed inward and pointing toward an axial center of the connectors for engaging the conductor tips and tightly engaging the stripped wire ends.

17. Wire connectors comprising conductive cylinders and having outer insulator cylinders extending axially beyond the conductive cylinders, the conductive cylinders having inner portions and outer ends, the inner portions having inward extending grippers for permanently attaching to conductive wires extending into the inner portions, the insulator cylinders having inner portions and outer ends, the inner portions of the insulator cylinders extending over the conductive cylinders, the outer ends of the insulator cylinders extending beyond the outer ends of the conductive cylinders, wherein the grippers in the conductive cylinders comprise lanced triangular sharp teeth bent inward in the conductive cylinders for engaging the conductive wires which are pushed into the conductive cylinders without distorting the conductive cylinders.

18. The apparatus of claim 17, wherein the outer ends of the outer insulator cylinders extend through walls of junction boxes.

19. The apparatus of claim 18, wherein the outer ends of the outer insulator cylinders extend to positions flush with outer surfaces of the walls.

20. The apparatus of claim 17, wherein the insulator cylinders have radially enlarged outer ends with inner diameters sufficient for receiving wire insulators and wherein the conductive cylinders have diameters sufficient for receiving conductive wires.

21. The apparatus of claim 17, wherein the insulator cylinders are color coded green for ground, black for common and white for neutral.

22. The apparatus of claim 17, wherein the conductive cylinders comprise rolled metal cylinders with triangular inward facing shark teeth having lanced sides and ends connected to the cylinder and having points pressed inward and pointing toward axial centers of the conductive cylinders for tightly engaging stripped wire ends.

23. The apparatus of claim 17, wherein the outer ends of the conductive cylinders have stepped diameters with inward pointing sharp teeth grippers for receiving and holding wires of varied sizes.

* * * * *

UNITED STATES PATENT AND TRADEMARK OFFICE
CERTIFICATE OF CORRECTION

PATENT NO : 5,936,200                                   Page 1 of 2
DATED : August 10, 1999
INVENTOR(S): Mike K. Park It is certified that error appears in the above-identified patent and that said Letters Patent is hereby corrected as shown below:

<u>In the Drawings</u>:

Kindly replace sheet 2 of 4 (Figures 5-8B) with the attached corrected drawing sheet.

Signed and Sealed this

Thirty-first Day of October, 2000

Attest:

Q. TODD DICKINSON

*Attesting Officer*                    *Director of Patents and Trademarks*